Oct. 27, 1953  A. SMERECK  2,657,002
ASH RECEPTACLE FOR VEHICLES
Filed March 3, 1950

Arthur Smereck
INVENTOR.

BY Clarence A. O'Brien
and Harvey B. Jacobson
Attorneys

Patented Oct. 27, 1953

2,657,002

UNITED STATES PATENT OFFICE 2,657,002

ASH RECEPTACLE FOR VEHICLES

Arthur Smereck, Detroit, Mich., assignor to Product Development Engineering Research and Promotion Corporation, Detroit, Mich., a corporation of Michigan Application March 3, 1950, Serial No. 147,514

1 Claim. (Cl. 248—206)

This invention relates to improvements in attachments for vehicles.

An object of this invention is to provide an improved device for attachment to a relatively stationary part of a vehicle, as the dashboard, to provide copious space for reception of cigarettes and cigars, either for final disposition thereof or for temporary holding.

Another object of this invention is to provide an improved ash tray and cigar or cigarette holder for a vehicle which is provided with a pair of troughs to support the cigars or cigarettes, said pair of troughs being so arranged that they converge toward the rear of the receptacle so that the cigarettes and cigars when placed therein will have their outer ends handy for the individual operating the vehicle or riding as the passenger.

Ancillary objects and features will become apparent in following the description of the illustrated form of the invention.

Figure 1:
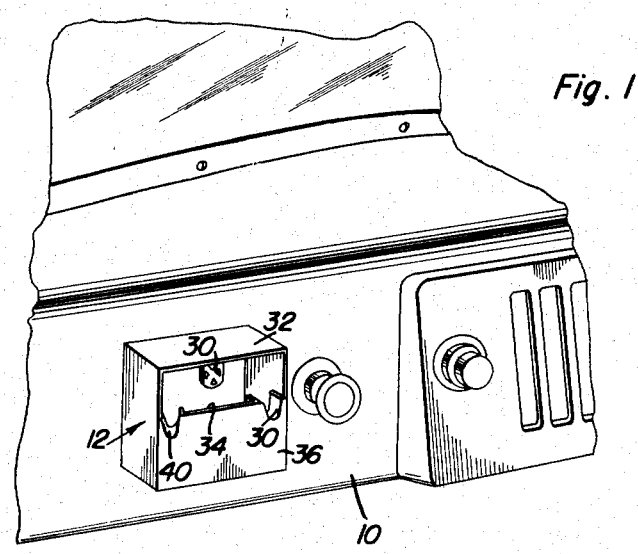
Figure 1 is a perspective view of a part of a dashboard of a vehicle showing the device fixed thereto.
Figure 2:
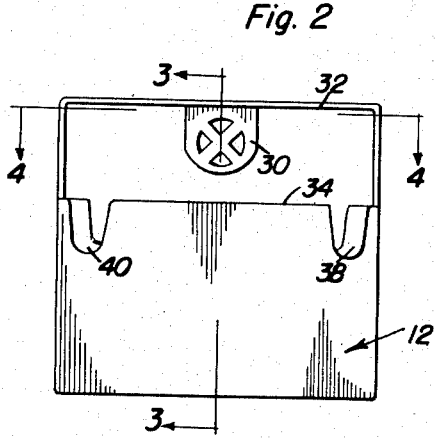
Figure 2 is a front view of the device.
Figure 3:
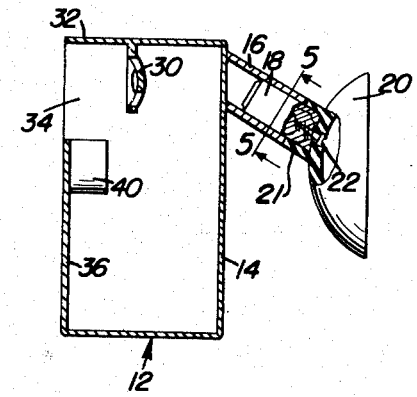
Figure 3 is a sectional view taken substantially on the line 3—3 of Figure 2 and in the direction of the arrows.
Figure 4:
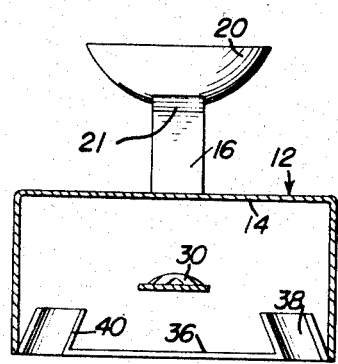
Figure 4 is a view taken substantially along the line 4—4 of Figure 2 and in the direction of the arrows; and, Figure 5 is a sectional view taken substantially on the line 5—5 of Figure 3 and in the direction of the arrows.
Figure 5:
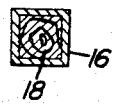

The dashboard 10 of a vehicle is illustrated as a conventional component thereof and is illustrative of any adaptable part of the interior of the vehicle, whether it is an automobile or a truck, a boat or aircraft or any other type of vehicle.

A substantially rectangular case 12 is provided of any suitable material, as metal, glass, certain forms of commercial plastics, or others. At the upper part of the back wall 14 of the case there is a preferably rectangular in cross section tube 16 which extends downwardly at an angle with respect to the horizontal. This tube has an open end and a polygonal wooden or other type material plug 18 is disposed therein and projects therefrom. This plug is fixed to a suction cup 20 which includes an integral, polygonal neck 21 which receives said plug. A screw 22 or other fastening medium is passed through the suction cup and disposed in the plug 18, thereby fixing the suction cup to the plug. By this expedient the plug retains the suction cup and the receptacle in assembly and provides a means of holding the receptacle removably fixed to the vehicle dashboard 10 in the illustrated instance.

An apertured cigarette or cigar stubber or stop 30 depends from the top wall 32 of the receptacle 12 and behind the opening 34 in the front wall 36.

A pair of rearwardly converging trough members 38 and 40 are provided in recesses formed on opposite ends of the upper edge of the front wall 36 of the receptacle 12. These troughs are adapted to accommodate cigars and cigarettes, holding them in place for temporary repose either while the operator of the vehicle is busy with other duties or as a rest measure. Passengers, of course, may use the device as they see fit.

Having thus described the invention, what is claimed as new is:

An ash receptacle fastener including a polygonal tube projecting from a receptacle, a plug of polygonal cross-section fixed in said tube and projecting longitudinally from the free end thereof, a suction cup engageable with a support for mounting the tube thereon, an integral neck of polygonal cross-section on the cup receiving the projecting portion of the plug, and a screw positively securing the cup to the outer end of said plug.

ARTHUR SMERECK.

References Cited in the file of this patent

UNITED STATES PATENTS

| Number | Name | Date |
|---|---|---|
| D. 79,930 | Ludwig | Nov. 19, 1929 |
| D. 113,759 | Murray | Mar. 14, 1939 |
| D. 119,335 | Klauber | Mar. 5, 1940 |
| 1,868,023 | North | July 19, 1932 |
| 1,932,625 | Hopple | Oct. 31, 1933 |
| 2,001,272 | Visser | May 14, 1935 |
| 2,009,360 | Koch | July 23, 1935 |
| 2,320,608 | Jones | June 1, 1943 |

FOREIGN PATENTS

| Number | Country | Date |
|---|---|---|
| 309,818 | Great Britain | Apr. 18, 1929 |
| 414,786 | Great Britain | Aug. 16, 1934 |